Oct. 11, 1966  TAKAO MIKI  3,277,875
SPARK ADVANCE DEVICE FOR INTERNAL COMBUSTION ENGINE
Filed Nov. 5, 1963  4 Sheets-Sheet 1

Oct. 11, 1966    TAKAO MIKI    3,277,875
SPARK ADVANCE DEVICE FOR INTERNAL COMBUSTION ENGINE
Filed Nov. 5, 1963    4 Sheets-Sheet 2

Oct. 11, 1966  TAKAO MIKI  3,277,875
SPARK ADVANCE DEVICE FOR INTERNAL COMBUSTION ENGINE
Filed Nov. 5, 1963   4 Sheets-Sheet 3

Oct. 11, 1966 TAKAO MIKI 3,277,875
SPARK ADVANCE DEVICE FOR INTERNAL COMBUSTION ENGINE
Filed Nov. 5, 1963 4 Sheets-Sheet 4
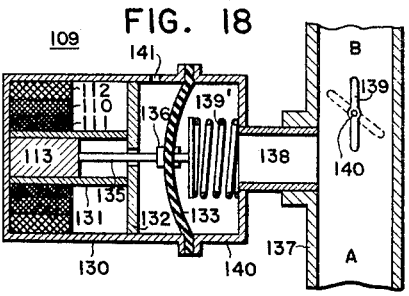
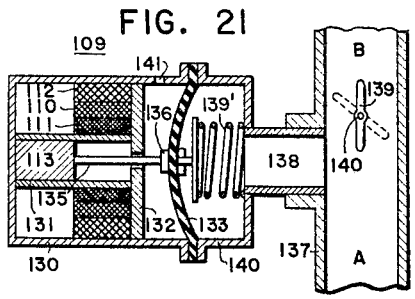
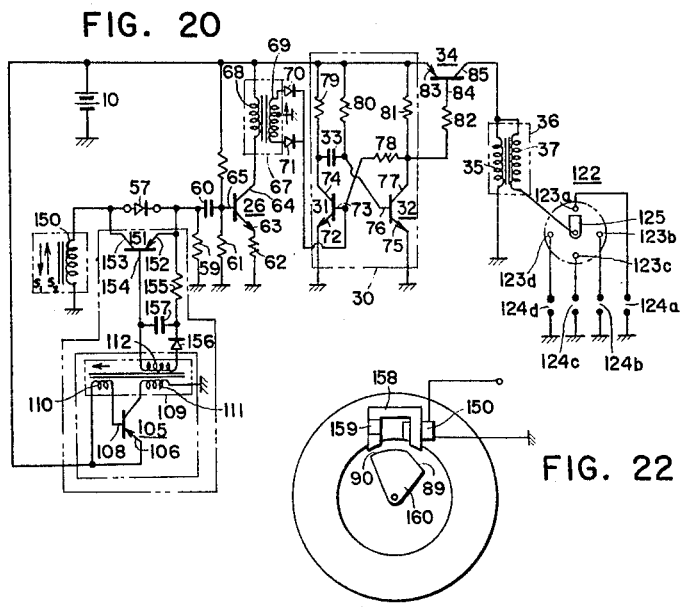
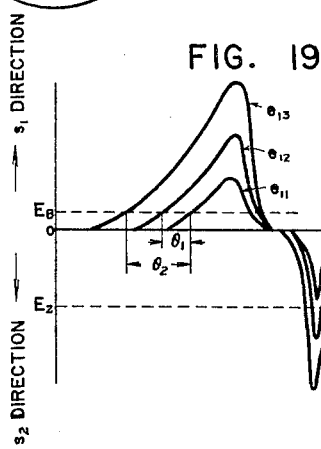
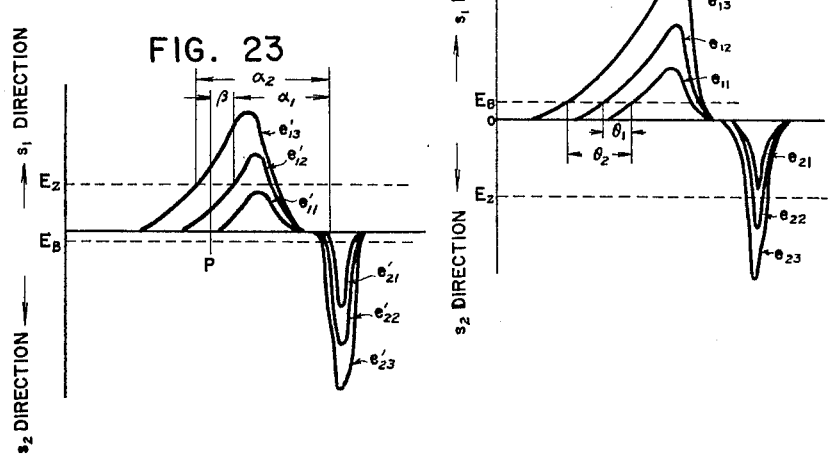

United States Patent Office 3,277,875
Patented Oct. 11, 1966

3,277,875
SPARK ADVANCE DEVICE FOR INTERNAL
COMBUSTION ENGINE
Takao Miki, Himeji, Hyogo, Japan, assignor to Mitsubishi
Denki Kabushiki Kaisha, Tokyo, Japan
Filed Nov. 5, 1963, Ser. No. 321,573
Claims priority, application Japan, Nov. 7, 1962,
37/50,266; Aug. 28, 1963, 38/45,923; Sept. 21,
1963, 38/50,433
8 Claims. (Cl. 123—117)

This invention relates to a spark advance device for an internal combustion engine and more particularly to a spark advance device for an internal combustion engine utilizing a solid state switching element such as a transistor or the like operative to be opened and closed to produce ignition sparks.

As well known, mechanical means have been previously employed to control an ignition point for an internal combustion engine in accordance with its operating conditions. For example, a spark advance due to a change in number of revolutions, i.e., rate of revolution, of the engine could be effected by displacing a cam of a contact breaker under control of a spark advance weight which can be, in turn, opened by having a centrifugal force applied thereto. Also, in order to effect a spark advance in accordance with a throttle aperture, a diaphragm subject to a negative pressure produced in an intake manifold was arranged to actuate an arm directly connected to the diaphragm to control the contact breaker as to an ignition point. In a contactless ignition system utilizing transistors, a stator coil of a pulse generator has been usually controlled in relative position either by the centrifugal force acting on a spark advance weight or by a negative pressure within an intake manifold. The prior art type of spark advance mechanisms such as above described, however, could not provide the proper ignition point upon rapidly accelerating or decelerating the associated internal combustion engines because of mechanical delay. In addition, such mechanisms are disadvantageous in that, during long service, wear of a bearing for manual control unit, a cam surface, contacts etc. effects change in ignition point resulting in decrease in engine output.

An object of the invention, therefore, is to provide in an ignition system for an internal combustion engine including an ignition coil adapted to be energized by a source of electric energy acting through a static switching element such as a transistor or the like and to strike a spark by turning off the element at an ignition point for the engine, a novel and improved spark advance device including no mechanically slidable component and capable of striking an ignition spark at the optimum ignition point for the engine even in transient state such as abrupt acceleration or deceleration of the engine.

Another object of the invention is to provide, in the ignition system as described in the first object, a spark advance device including a combination of a novel and improved single pulse generator and Zener diode for effecting spark advance.

A further object of the invention is to provide a novel and improved spark advance device for an internal combustion engine whereby the necessity of providing a long pipe extending from an intake manifold for the engine to a distributor for the purpose of detecting a pressure within the manifold to effect spark advance is eliminated.

A still further object of the invention is to provide a novel and improved spark advance device for an internal combustion engine eliminating the necessity of providing any electric contacts across which spark may be struck.

With these objects in view, the invention resides in a spark advance device for an internal combustion engine comprising a semiconductor switching element such as a switching transistor for switching an ignition coil, said element being responsive to a trigger pulse to turn off the ignition coil to produce an ignition pulse.

The trigger pulse is variable in duration in accordance with the operating state of the engine, such as its rate of revolution and/or loading of the engine. Also the trigger pulse may be effective to turn off the coil at a time point dependent upon the operating state of the engine. In this way, an ignition point is advanced.

The invention become more readily apparent from the following detailed description taken in conjunction with the accompanying drawings in which:

FIG. 18 is a sectional view of a transformer in a second pulse control device used with the circuitry illustrated in FIG. 15;

FIG. 19 is a graph illustrating output waveforms from the pulse generator shown in FIGS. 16 and 17;

FIG. 20 is an electric circuit diagram of a still further modification of the invention;

FIG. 21 is a sectional view of a transformer in a second pulse control device used with the circuitry illustrated in FIG. 20;

FIG. 22 is a front view of a pulse generator suitable for use with the circuitry illustrated in FIG. 20; and FIG. 23 is a graph illustrating waveforms of output signal from the pulse generator shown in FIG. 22.

Figure 1:
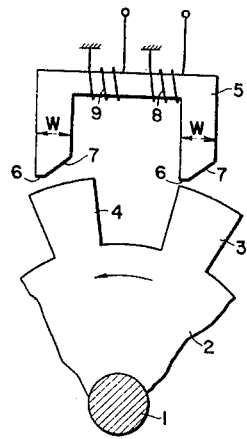
FIG. 1 is a fragmental diagrammatic view of a pulse generator suitable for use with an ignition device illustrated in FIG. 2.

Referring now to FIG. 1 of the drawings, there is illustrated a pulse generator suitable for use with the invention. The pulse generator illustrated comprises a rotatory shaft 1 adapted to be driven by an internal combustion engine (not shown) in the direction of the arrow and a rotor member 2 of any suitable magnetic material rigidly secured to the shaft 1 and including a plurality of magnetic pole pieces 3 and 4 radially projecting beyond the outer periphery at predetermined angular intervals.

The generator further comprises a U-shaped magnetic core 5 disposed around the rotor member 2 such that a pair of leg portions or a leading and trailing pole tips of the core 5 can face the magnetic pole pieces 3 and 4 of the rotor member 2 with an air gap formed therebetween respectively. The tip surface of each pole tip includes a circumferential surface portion 6 substantially perpendicular to the axis of the leg portion and a bevelled surface portion 7. The air gap formed between the pole tips 6 or 7 of the core 5 and the adjacent magnetic pole piece 3 or 4 is such that the width of the air gap associated with the bevelled surface portion 7 is progressively decreased in the direction of rotation of the rotor member 2. As shown in FIG. 1, the core member 5 includes an exciting winding 8 and an output or pulse winding 9 inductively disposed thereon. The exciting winding 8 serves to energize the magnetic core 2 and the pulse winding 9 serves to produce an ignition pulse. In order for the pulse generator to produce trigger pulses, a circuitry shown in FIG. 2 may be advantageously used.

Figure 2:
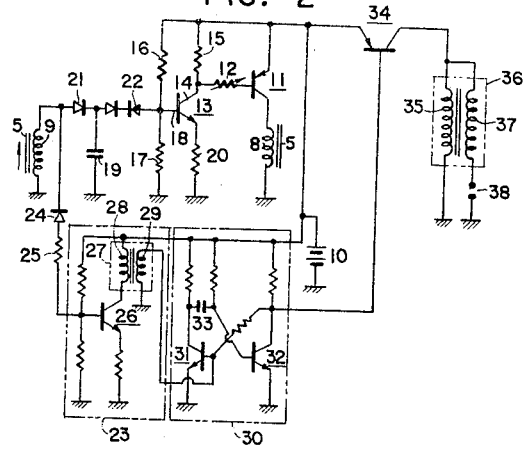
FIG. 2 is an electric circuit diagram of an ignition device incorporating the invention.

Referring now to FIG. 2 of the drawings, there is illustrated an ignition circuitry according to the teachings of the invention. In order to control energization of the exciting winding 8 on the core 5, a suitable source of direct current illustrated as a battery 10 is provided having one terminal grounded and the other terminal connected to an emitter electrode of a p-n-p type transistor 11. The transistor 11 includes a collector electrode connected to the reference point or ground through the exciting winding 8 and a base electrode connected to a variable resistor 12. The variable resistor 12 is controlled in resistance in accordance with loading of an internal combustion engine (not shown) for example, with a vacuum established in an intake manifold for the engine. Namely the resistor 12 has a resistance increased with an increase in the load of the engine.

Another transistor of n-p-n type 13 is connected in the base circuit of the transistor 11 to control the conductive state of the latter and includes a collector electrode 14 connected to the source 10 through a resistor 15 and to the variable resistor 12. A pair of resistors 16 and 17 serially connected to each other is connected across the source 10 and has a common junction connected to the base electrode 18 of the transistor 13 to maintain the same at a suitable base potential. A capacitor 19 is serially connected with the resistor 20 in the base circuit of the transistor 13. The capacitor 19 is adapted to be charged with an output pulse of positive polarity (as designated by the direction of the arrow shown aside the winding 9 in FIG. 2) from the pulse winding 9 through a rectifier or diode 21 and serves to render the transistor 13 conducting when discharged. The base circuit of the transistor 13 further includes a Zener diode 22 connected between the junction of the rectifier 21 and the capacitor 19 and the base electrode 18 of the transistor 13 through a rectifier or diode and capable of being broken down when a voltage across the capacitor 19 exceeds a predetermined magnitude.

A dotted-and-dashed block generally designated by the reference numeral 23 includes an amplifier circuit connected to the pulse winding 9 through a capacitor 24 and a resistor 25 and adapted to amplify an output of negative polarity from that winding. The amplifier circuit 23 includes an n-p-n transistor 26 normally conductive and capable of being non-conductive by having the output of negative polarity applied thereto, and a transformer 27 including a primary winding 28 connected in the collector circuit of the transistor 26 and a secondary winding 29 connected to a waveform shaping circuit generally designated by the reference numeral 30.

The shaping circuit 30 is a monostable multivibrator comprising an n-p-n type transistor 31 having normally its substantially nonconducting state, an n-p-n type transistor 32 having normally its substantially conducting state, and a capacitor 33 as shown in FIG. 2. Upon receipt of an output from the secondary winding 29 of the transformer 27 the transistor 31 becomes conductive and the capacitor 33 is adapted to be discharged during conduction of the transistor 31 to thereby turn off the transistor 32. The shaping circuit 30 serves to convert the output waveform from the amplifier circuit 23 into a rectangular waveform.

A semiconductor switching element 34 such as a switching transistor of p-n-p type is connected to the output of the shaping circuit 30 to thereby be controlled in its conduction by the output from the same. The transistor 34 serves to open and close a primary winding 35 of an ignition coil 36 connected in the collector circuit of the transistor. The ignition coil 36 includes a secondary winding 37 inductively disposed with respect to the primary winding 35 and connected to one terminal of an ignition plug 38. The other terminal of the plug is grounded.

The arrangement thus far described is operated as follows:

It is assumed that the base electrode 18 of the transistor 13 is at a suitable base potential by means of a voltage divider comprising the resistors 16 and 17 whereby the transistor is conducting with an appropriate voltage drop developed across the collector and emitter electrodes thereof. Thus the transistor 11 has a flow of base current therethrough whose magnitude is limited by the resistance of the now conducting transistor 13 as well as the resistors 12 and 20 and the exciting coil 8 is energized. Under these circumstances, the exciting winding 8 energized generates a low magnetomotive force which, in turn, produces a magnetic flux relatively low in density within the magnetic core 5. Such magnetic flux flows through both pole tips in such a way as to be concentrated on the circumferential surface portions 6 substantially perpendicular to the axis of each leg portion of the core.

Assuming now that the rotor member 2 is rotated in the direction of the arrow shown in FIG. 1 it will be readily understood that voltage pulses of alternate polarity are produced across the pulse winding 9. Because of the low density of flux the trigger pulses thus produced are relatively low and may have a waveform $e_1$ illustrated in FIG. 3. The pulse of negative polarity is passed through the rectifier 24 and amplified by the amplifier circuit 23. The amplified pulse is converted into a rectangular waveform by the pulse shaper circuit 29. This rectangular waveform increases the base potential of the switching transistor 34 to trigger the same from its on state to its off state whereby an ignition discharge occurs across the ignition plug 38.

On the other hand, the pulse of positive polarity produced across the pulse winding 9 serves to charge the capacitor 19 through the rectifier 21. However, the capacitor 19 will have a charged voltage there across less than the breakdown voltage of the Zener diode 22. This ensures that the voltage across the exciting winding 8 is continued to be maintained at a predetermined magnitude.

Figure 3:
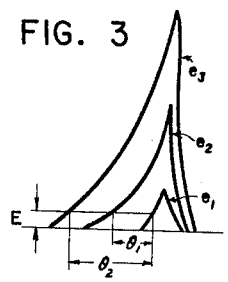
FIG. 3 is a graph illustrating waveforms of ignition pulse produced by the pulse generator shown in FIG. 1.

If the rate of revolution of the internal combustion engine (not shown) is increased a variation per unit time in magnetic flux within the magnetic core 5 becomes high and hence a higher voltage is produced across the pulse winding 9 until the voltage across the capacitor 19 will exceed the breakdown voltage of the Zener diode 22 to break down the same. The breakdown of the Zener diode 22 permits the transistor 13 to have additionally that portion of the flow of base current therethrough supplied by the charged capacitor 19 resulting in a further decrease in voltage drop across the collector and emitter electrodes of the transistor 13. Therefore, the base current flowing through the transistor 11 is increased to increase energization of the exciting winding 8 to thereby increase the magnetic flux within the core 5. This increase in magnetic flux permits the magnetic flux to pass through each of the pole tips on the bevelled surface portion 7, in addition to the surface portion 6. As a result, a waveform of voltage pulse produced across the pulse winding 9 is such that, as shown in FIG. 3, the voltage pulse begins to be developed earlier than the voltage pulse represented by the waveform $e_1$ in FIG. 3 has its peak value higher than the voltage pulse $e_1$. On the other hand, shaper circuit 29 has a predetermined response level or a predetermined potential at and above which the circuit is put in its operating state. Assuming that this potential has a magnitude E as illustrated in FIG. 3, it will be understood from FIG. 3 that the pulse $e_2$ advances the ignition timing by an angle of $\theta_1$.

A further increase in engine's speed causes the voltage across the capacitor 19 to further increase to render the transistor 13 more conducting whereby a current for energizing the exciting winding 8 is increased. Therefore, it will be seen from FIG. 3 that the pulse winding 9 has thereacross a waveform of voltage pulse $e_2$ illustrated in FIG. 3 and leading the pulse $e_1$ by an angle of $\theta_2$.

If the engine is still further increased in number of revolution, the transistor 11 will become more conducting with a low voltage drop developed across the emitter and collector electrodes thereof until a voltage substantially equal to the voltage across the source 10 is applied to the exciting winding 8. On the other hand, the rotor member 2 is increased in speed and the magnetic flux passing through the bevelled surface portion 7 of each pole tip is also converted into a voltage pulse produced across the pulse winding 9. Under these circumstances, a spark advance reaches its upper limit and the ignition timing characteristics of the circuitry is saturated.

Figure 4:
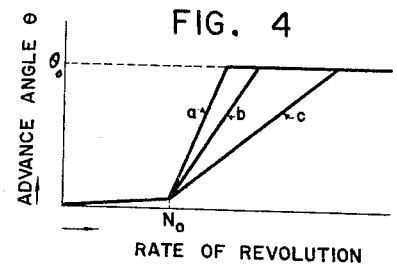
FIG. 4 is a graph illustrating the ignition timing adjustment characteristics of the ignition shown in FIG. 2.

With the variable resistor 12 maintained at its minimum value, the spark advance characteristic of the circuitry as above described may be illustrated by a curve $a$ shown in FIG. 4 wherein the axis of abscissas represents the number of revolution N of the driving shaft 1 (FIG. 1) and the axis of ordinates represents an advance angle $\theta$.

The variable resistor 12 is designed and constructed such that if the engine is loaded at and above a point where a spark advance is initiated or corresponding to point $N_0$ (see FIG. 4) that its resistance increases in accordance with the load on the engine to limit the base current flowing through the transistor 11 to thereby decrease the flow of current through the exciting winding 8 resulting in the corresponding delay of an ignition point. Therefore, the ignition timing characteristics of the circuitry may be illustrated by curve $b$ shown in FIG. 4. The more the load on the engine and hence the greater resistance of the variable resistor, the more the ignition point will be delayed. The ignition timing characteristics in this case may be illustrated by curve $c$ shown in FIG. 4.

The maximum magnitude or fully controlled magnitude $\theta_0$ of the advance angle depends upon a width W of each leg portion of the core 5. Therefore, the width of each leg portion may be varied in accordance with the required ignition timing characteristics of an internal combustion engine used. Also the curve $a$, $b$, or $c$ may desired, have a wide variety of shape or slope by changing the shape of the bevelled surface portions 7 of the core 5.

In the arrangement illustrated in FIG. 2 the loading of the internal combustion engine has been detected by changing the resistance of the variable resistor 12 and the spark advance has been performed in accordance with the detected load of the engine. This measure may lead to a fear that an adjustable slide on the variable resistor will be in unsatisfactory contact with the resistance portion of the resistor. To eliminate such mechanical contact a Hall generator may be advantageously used as shown in FIG. 5.

Figure 5:
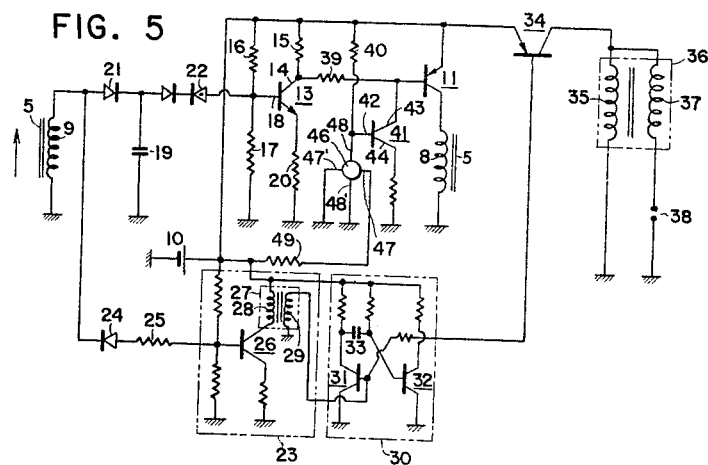
FIG. 5 is an electric circuit diagram of a modification of the invention.

Referring now to FIG. 5 wherein like reference numerals designate components similar to those shown in FIG. 2, there is illustrated a modification of the invention including a Hall generator in place of the variable resistor 12. The modification contemplates elimination of the necessity of using mechanical slide as above described and improvement of the reliability.

An arrangement illustrated in FIG. 5 comprises a fixed resistor 39 at the position of the variable resistor 12 shown in FIG. 2 and an n-p-n type transistor 41 including a base, a collector and an emitter electrode 42, 43 and 44 respectively. The base electrode 42 is connected through a resistor 40 to a positive terminal of a source of direct current 10 whose negative terminal is grounded, the collector electrode 43 of the transistor 41 is converted to a base electrode of a transistor 11 and the emitter electrode 44 is connected to the ground through an emitter resistor 45. A Hall generator generally designated by the reference numeral 46 includes a pair of input terminals 47 and 47′ and a pair of output terminals 48 and 48′ with the input terminal 47 connected to the positive terminal of the source 10 through a resistor 49 and with the output terminal 48 connected to the base electrode 42 of the transistor 41. The remaining terminals 47′ and 48′ are connected to the ground. The other respects are substantially identical with the arrangement shown in FIG. 2 and need not be described.

Figure 6:
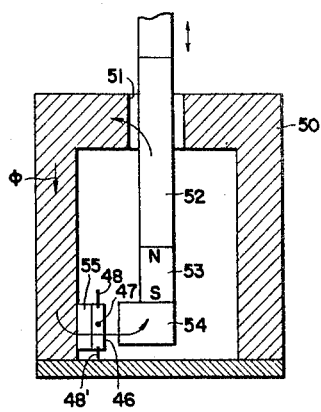
FIG. 6 is a schematic sectional view of a load detector used with the circuitry illustrated in FIG. 5.

The Hall generator 46 is illustrated in its actually used state in FIG. 6. The generator illustrated comprises a hollow cylindrical main body of any suitable magnetic material 50 open at its lower end and provided at its upper end with a central opening 51. A control rod 52 is inserted into the interior of the main body 50 through the central opening 51 for longitudinal movement and secured at its inner end to a magnetic pole piece 54 through a permanent magnet 53. The Hall generator 46 is disposed facing the free end of the magnetic pole piece 54 with a small air gap left between and the same and the adjacent face of the generator 46 secured to a support 55 of any suitable magnetic material which, in turn, is attached on the internal surface of the main body 50. The Hall generator includes the input and output terminals disposed in cruciform relationship.

In operation, the control rod 52 is longitudinally movable in accordance with a vacuum established in an intake manifold for an intake manifold for an internal combustion engine involved to thereby change that area of the magnetic pole piece 54 directly facing the Hall generator 46. Therefore, with the input terminals connected across the source of direct current 10, the longitudinal movement of the control rod 52 induces an output from the Hall generator across the output terminals which is proportional to that area of the Hall generator directly facing the pole piece 54.

Figure 7:
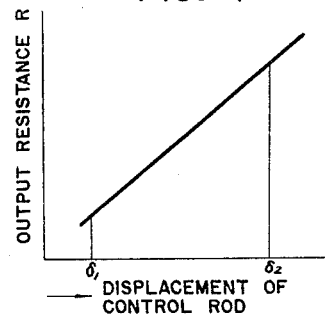
FIG. 7 is a graph illustrating an output from the detector shown in FIG. 5.

When the internal combustion engine equipped with the ignition circuitry illustrated in FIGS. 5 and 6 is lightly loaded, an ignition point is required to advance in order to operate the engine with a high efficiency. For this purpose, the fact that a vacuum established in the intake manifold of the engine becomes high on light loading of engine may be utilized. For example, a diaphragm may be used to convert that vacuum into a physical displacement which, in turn, is transferred to the control rod 52 illustrated in FIG. 6. When the control rod 52 is in its position illustrated in FIG. 6 or when the Hall generator 46 fully faces the magnetic pole piece 54 permitting substantially all of magnetic flux originating from the permanent magnet 53 to pass through the Hall generator and a resistance across the output terminals 48 and 48′ of the generator is maximum. This maximum output resistance can correspond to the lowest load on the engine or the highest vacuum established in the intake manifold for the engine as represented by a point $\delta_0$ shown in FIG. 7 wherein the abscissa represents the displacement of the control rod 52 and ordinate represents the output resistance R of the Hall generator 46.

Under these circumstances, the transistor 41 will have supplied thereto a base current sufficient to render the transistor 11 highly conducting permitting a sufficient magnitude of current to flow through the exciting winding 8. Therefore, the voltage pulse across the signal winding 9 is changed from the waveform $e_1$ to the waveform $e_2$ or $e_3$ as shown in FIG. 3 whereby the ignition point is correspondingly advanced.

If the engine is increased in load to reduce the vacuum in the intake manifold then the control rod 52 is moved upwardly from its position illustrated in FIG. 6. This upward movement of the rod 52 causes reduction in magnetic flux passing through the Hall generator 46 to decrease the output resistance R of the generator which may correspond, for example, to a point $\delta_1$ shown in FIG. 7. Therefore, the transistor 41 will have a low base current flowing therethrough to decrease the flow of current through the exciting winding 8. This results in a voltage pulse of negative polarity across the pulse winding 9 being changed from the waveform $e_3$ through the waveform $e_2$ to the waveform $e_1$ (FIG. 3). Thus the advance angle has its minimum value.

Figure 8:
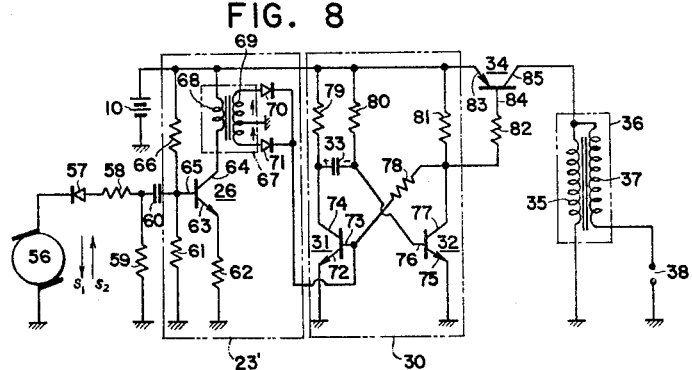
FIG. 8 is an electric circuit diagram of another modification of the invention.

Referring to FIG. 8, there is illustrated another modification of the invention utilizing the fact that trigger pulses of alternate polarity produced by a pulse generator are different in phase, for the purpose of effecting spark advance. An arrangement illustrated comprises a pulse generator generally designated by the reference numeral 56 and including one of output terminals grounded. The other output terminal is connected through a Zener diode 57 and a resistor 58 which is connected to the ground through a resistor 59, to one side of a capacitor 60. The other side of the capacitor 60 is connected to another grounded resistor 61 and to an input to an amplifier and rectifier circuit generally designated by the reference numeral 23'.

The amplifier and rectifier circuit 23' comprises an n-p-n type transistor 26 including an emitter electrode 63 connected to the ground through an emitter resistor 62, a collector electrode 64 and a base electrode 65 connected to the other side of the capacitor 60. The base electrode 65 of the transistor 26 also connected to an intermediate point of a voltage divider comprising a series combination of the resistor 61 and a resistor 66 and connected across a source of direct current 10 such as an accumulator having a negative terminal grounded. The collector electrode 64 of the transistor 26 is connected to a primary winding 68 of a transformer 67. That portion of the circuit 23' above described is similar to the amplifier circuit 23 as previously described in conjunction with FIG. 2. In the circuit 23' it is noted that the transformer 67 includes a center-tapped secondary winding 69 both ends of which are connected to a pair of rectifiers 70 and 71, connected together to an input of a monostable multivibrator generally designated by the reference numeral 30 with the center tap connected to the ground.

The monostable multivibrator 30 shown in FIG. 8 is quite identical with the circuit 30 shown in FIG. 2. More specifically, the pulse multivibrator circuit 30 shown in FIG. 8 comprises an n-p-n type transistor 31 including an emitter, a base and a collector electrode 72, 73 and 74 respectively and an n-p-n type transistor 32 including an emitter, a base and a collector electrode 75, 76 and 77 respectively. The emitter electrode 72 of the transistor 31 is grounded and the base electrode 73 is connected to a resistor 78. The collector electrode 74 of the transistor 31 is connected to the positive terminal of the source 10 through a resistor 79 connected across a series combination of a capacitor 33 and a resistor 80.

The emitter electrode 75 of the transistor 32 is also connected to the ground and the base electrode 76 is connected to the junction of the capacitor 33 and the resistor 80. The collector electrode 77 of the transistor 32 is connected to the positive terminal of the source through an output resistor 81 connected to the resistor 78.

The output resistor 81 is connected through a resistor 82 between an emitter and a base electrode 83 and 84 respectively of a switching transistor of p-n-p type 34. The switching transistor 34 includes a collector electrode 85 connected to a primary winding 35 of an ignition coil 36. The coil 36 includes a secondary winding 37 connected to one side of an ignition plug 38. The other side of the ignition plug 38 is grounded.

Figure 9:
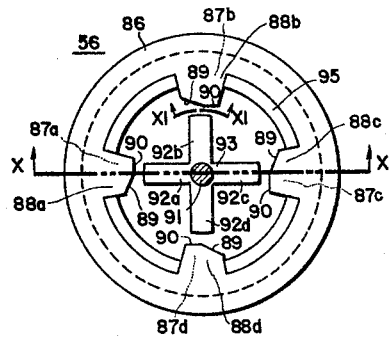
FIG. 9 is a front view of a pulse generator suitable for use with the circuitry illustrated in FIG. 8.
Figure 10:
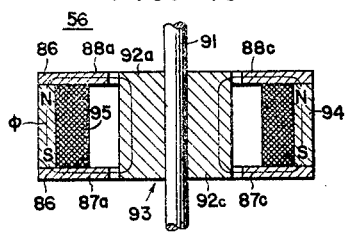
FIG. 10 is a section taken along the line X—X of FIG. 9.

The pulse generator 56 will now be described in conjunction with FIGS. 9 through 11. As shown in FIGS. 9 and 10, the generator comprises a pair of annular disks of any suitable magnetic material 86 facing each other in parallel relationship with a predetermined distance maintained therebetween. Each of annular disks 86 is provided on the inner periphery with plural pairs in this case two pairs of radial magnetic pole pieces 87a, b, c, d or 88a, b, c, d projecting beyond the same at equal angular intervals. The pole pieces 87a through 87d align with the pole pieces 88a through 88d respectively. The free end surface of each of these pole pieces includes a bevelled surface portion 89 and a circumferential surface portion 90 substantially perpendicular to the longitudinal axis thereof.

A rotatory shaft 91 is disposed on the common central line of the annular disks 86 and at right angles to the surfaces of the same, and is adapted to be driven in the direction of the arrow shown in FIG. 9 by an internal combustion engine (not shown) involved. Attached on the rotatory shaft 91 is a rotor member 93 including two pairs of radial, magnetically permeable pieces 92a, b, c and d in cruciform relationship with both surfaces of the rotor member substantially flush with the associated surfaces of the annular disks.

The poles pieces and permeable pieces are constructed and arranged such that, with the pole pieces facing the permeable pieces, a very narrow air gap is formed between the circumferential pole face 90 of each pole piece and the pole face of the adjacent permeable piece and that the bevelled surface portion 89 is formed on that side of the associated magnetic pole piece which any of the rotating permeable pieces first approaches, with the air gap gradually decreased in the direction to rotate the rotor member.

A hollow cylindrical permanent magnet 94 is fitted between the pair of magnetic disks 86 to encircle the rotor member 93 to complete a magnetic core for the generator. In this case, the magnet 94 is disposed in such a manner that its N pole contacts the upper disk 86 as viewed in FIG. 10 and that its S pole contacts the lower disk 86. Disposed on the inside of the magnet 94 is an annular pulse winding 95 having both ends connected to the output terminals of the pulse generator 56.

The arrangement illustrated in FIG. 8 is operated as follows:

It is assumed that the transistor 32 has a base current supplied by the source 10 through the resistor 80 to thereby be conducting. Therefore, the switching transistor 34 is in its on state permitting the primary winding 35 of the ignition coil 36 to be energized by the source 10 through the conducting transistor 34. At that time, however, the transistor 31 is in its off state because of its low base potential. The transistor 26 has its suitable base potential determined by the relative magnitudes of the resistors 66 and 61 and is conducting with a suitable voltage drop maintained across the emitter and collector electrodes 63 and 64 respectively thereof. This permits the primary winding 68 of the transformer 67 to be energized by the source 10 through the transistor 62.

Figure 12:
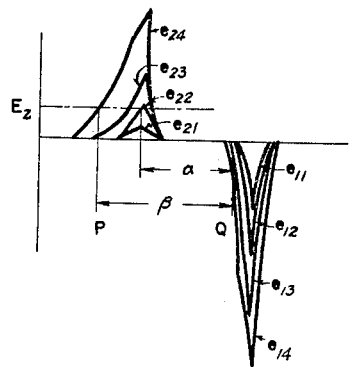
FIG. 12 is a graph illustrating waveforms of an ignition pulse produced by the pulse generator shown in FIGS. 9 through 11.

When the internal combustion engine (not shown) is operated to rotate the rotor member 93 in the direction of the arrow shown in FIG. 9, the pulse winding 95 may produce any of trigger pulses as shown in FIG. 12. If the engine is low in speed, a pair of pulses $e_{21}$ and $e_{11}$ as illustrated in FIG. 12 are alternately produced across the pulse winding 95. More specifically, as each permeable piece of the rotor member 93 approaches the adjacent magnetic pole piece of the core, a magnetic flux $\Phi$ such as shown by a closed dotted-and-dashed line in FIG. 10 is progressively increased to produce the pulse $e_{21}$ across the pulse winding 95 due to this variation in magnetic flux. On the other hand, as the rotor member is further rotated to progressively separate its permeable pieces away from the adjacent pole pieces, the magnetic flux $\Phi$ is progressively decreased to produce a single or voltage pulse $e_{11}$ across the pulse winding 95 due to this variation in magnetic flux. As seen in FIG. 12, the pulse $e_{21}$ is higher in peak value than the pulse $e_{11}$ for the reason that the bevelled surface 89 of each pole piece has a high magnetic reluctance to thereby suppress variation in magnetic flux due to the increasing flux. It is assumed that the pulse $e_{21}$ is in the sense of the arrow $s_1$ shown aside the generator 56 in FIG. 8 while the pulse $e_{11}$ is in the sense of the arrow $s_2$.

As shown in FIG. 12, the pulse $e_{21}$ has its peak value less than the Zener or breakdown voltage $E_Z$ of the Zener diode 57. Therefore, it will be seen that the $e_{21}$ is blocked by the diode 57, and does not affect the transistor 26. However, the pulse $e_{11}$ can control the transistor 26 to strike an ignition spark across the ignition plug 38. More specifically, when the pulse $e_{11}$ is produced the base current flowing through the transistor 26 decreases. The decrease in the base current causes change in current flowing through the primary winding 63 of the transformer 67 to induce a voltage across the secondary winding in the direction of the arrows shown aside the same in FIG. 8. The voltage thus induced is passed through the rectifier 70 to the input to the monostable multivibrator or to the base electrode 73 of the transistor 31 to render the same conducting. The conduction of the transistor 31 causes the capacitor 33 previously charged with a polarity designated in FIG. 8 to be discharged through the now conducting transistor 31 and also turns off the transistor 32. The turning off of the transistor 32 causes increase in the potential at the collector 77 thereof to turn off the switching transistor 34. Thus the energizing current flowing through the primary winding 35 of the ignition coil 36 is rapidly decreased to effect an ignition discharge across the ignition plug 38.

Assuming now that the engine is progressively increased in rate of revolution, the pulse produced by the pulse generator 56 is not only increased in peak magnitude but also begins to be formed early as compared with the case of a low rate of revolution for the reason that variation in magnetic flux on each of the magnetic pole pieces and in particular on that portion thereof having a high reluctance, for example, the bevelled face 89 is gradually converted into the pulse. When the rate of revolution of the engine has reached a predetermined value pulses $e_{22}$ and $e_{12}$ are produced as shown in FIG. 12. The pulse $e_{22}$ has its peak magnitude above the breakdown voltage $E_Z$ of the Zener diode 57 and hence can control the transistor 26 to ignite the ignition plug 38. In other words, the pulse $e_{22}$ is operated in the substantially same manner as above described in conjunction with the pulse $e_{11}$ except that the rectifier 71 effects rectification. However, it is noted that the ignition point is advanced by an angle of $\alpha$ (see FIG. 12).

Also the pulse $e_{12}$ turns off the switching transistor 34 permitting the ignition coil 38 to provide an ignition voltage. However, such an ignition voltage is applied to the ignition plug during the combustion stroke of the engine and therefore does not interfere with the operation of the engine.

A further increase in rate of revolution of the engine, is accompanied by a further increase in peak magnitude of pulse and also by a further advance of ignition timing. In addition, an advance angle for ignition point is progressively increased. However, after trigger pulses $e_{24}$ and $e_{14}$ shown in FIG. 12 have been produced by the pulse generator, any pulse can no longer be higher in magnitude than the pulse $e_{24}$. Therefore, a maximum possible advance angle for ignition does not exceed an advance angle $\beta$ (see FIG. 12) for the pulse $e_{24}$.

Figure 13:
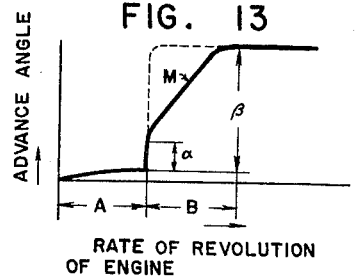
FIG. 13 is a graph illustrating the spark advance characteristics of the circuitry shown in FIG. 8.

The spark advance characteristics of the circuitry as above described may be illustrated by a graph shown in FIG. 13 wherein the abscissa represents the number of revolution of an internal combustion engine and the ordinate represents an advance angle. Within a range designated by the reference character A in FIG. 13 the ignition is effected by the pulses in the sense of the arrow $s_1$ shown in FIG. 8 whereas within a range B the ignition is effected by the pulses in the sense of the arrow $s_2$.

Figure 14:
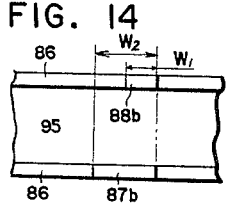
FIG. 14 is a fragmental side elevational view of a pulse generator capable of being used with the circuitry illustrated in FIG. 8.
Figure 16:
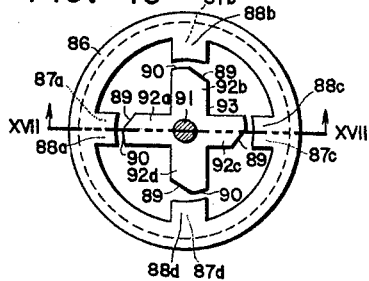
FIG. 16 is a front view of a pulse generator suitable for use with the circuitry illustrated in FIG. 15.

While the magnetic core of the pulse generator 56 has previously been illustrated and described as including plural pairs of aligned magnetic pole pieces each pair including the innermost extremities equal to each other in circumferential width, the pair of aligned magnetic pole pieces may include the innermost extremities different from each other in such width with the satisfactory results. For example, each of the upper magnetic pole pieces may include the circumferential face having a circumferential width of $W_1$ while each of the lower magnetic pole pieces may include the circumferential face having a circumferential width of $W_2$ larger than $W_1$ with each pair of aligned pieces disposed in offset relationship. This is shown in FIG. 14. In this case those edges of the aligned pieces pair facing the head of the arrow indicating of the direction of rotation is aligned with each other. Alternatively, a bevelled face such as 89 and a circumferential face such as 90 may be provided on each of the magnetically permeable pieces of a rotor member at the outermost extremity instead of magnetic pole pieces of a magnetic core as illustrated in FIG. 16 with the satisfactory results.

The certain types of internal combustion engines may be required to have the spark advance characteristics such as shown by dotted line in FIG. 13 in order to facilitate their starting. To this end, all the magnetic pole pieces may be conveniently provided at the extremities with circumferential faces arranged on a common circle to form arcuate air gaps of uniform width between the pole pieces and permeable pieces of a rotor member such as 93 opposing the same to thereby render the magnetic reluctances of and adjacent the air gaps uniform.

Since the arrangement illustrated in FIG. 8 includes a single pulse generator using a permanent magnet as its field the same extremely advantageous light weight upon assembling the same in a housing of a distributor because the generator is of light weight. The use of the single pulse generator permits the distributor to be reduced in axial length whereby any vibration of its shaft can be decreased This ensures that timing of ignition is maintained accurate.

Figure 15:
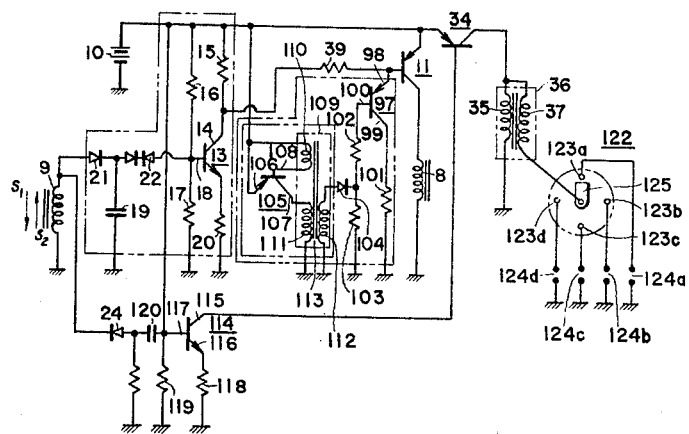
FIG. 15 is an electric circuit diagram of a further modification of an ignition device incorporating the invention.

Referring to FIG. 15, there is another modification of the invention capable of controlling a duration of a trigger pulse and ignition timing in accordance with both the number of revolutions of an internal combustion engine involved and loading of the engine. To this end, the modification uses a pair of windings having a degree of coupling therebetween variable in accordance with loading of the engine to control the duration of the trigger pulse and ignition timing.

In FIG. 15, wherein like reference numerals designate the components corresponding to those illustrated in FIG. 2, a transistor 97 of the p-n-p type 97 includes an emitter, a collector and a base electrode 98, 99 and 100 respectively. The emitter electrode 98 of the transistor 97 is connected to a base electrode of a p-n-p type transistor 11 and the collector electrode 99 is connected to the ground through a collector resistor 101. The base electrode 100 of the transistor 97 is connected to the ground through a series combination of resistors 102 and 103.

A p-n-p type transistor 105 including an emitter, a collector and a base electrode 106, 107 and 108 respectively is provided to energize a control transformer 109 for controlling ignition timing in accordance with the operational condition of the engine. The control transformer 109 includes an auxiliary winding 110, a main winding 111 and an output winding 112. All these windings are inductively disposed on a magnetic core 113. As will be described later, the magnetic core 113 is movable in accordance with a vacuum established in an intake manifold for the engine to thereby change a degree of coupling between the main and output windings 111 and 112. The emitter electrode 106 of the transistor 105 is connected to a positive terminal of a source of direct current 10. The auxiliary winding 110 of the control transformer 109 is connected across the emitter and base electrodes 106 and 108 respectively of the transistor 105 and the main winding 111 is connected between the collector electrode 107 and the ground. The output winding 112 is connected across the resistor 103 through a rectifier 104.

An n-p-n type transistor 114 includes a collector electrode 115 connected to a base electrode of a p-n-p type transistor 34 for switching an ignition coil 36, an emitter electrode 116 connected to the ground through an emitter resistor 118, and a base electrode 117 connected to the ground through a base resistor 119. The base electrode 117 is also connected to the positive terminal of the source 10 and to a capacitor 120 which, in turn, is connected to a pulse winding 9 of a pulse generator through a rectifier 24.

Since it is assumed that the arrangement illustrated is associated with a multi-cylinder engine a distributor device generally designated by the reference numeral 122 is provided. The distributor device 122 is of conventional construction and includes four distributor electrodes 123a, b, c and d connected respectively to four ignition plugs 124a, b, c and d disposed in the respective cylinders of the engine (not shown). It is to be understood that the number of the distributor electrodes may be varied dependent upon the number of engine cylinders. The device 122 includes further a rotatory electrode 125 connected to the secondary winding 37 of the ignition coil 36. The other respects are substantially similar to the arrangement illustrated in FIG. 2.

Figure 11:
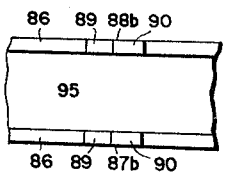
FIG. 11 is a section fragmental side elevational view as viewed along the line XI—XI of FIG. 9.
Figure 17:
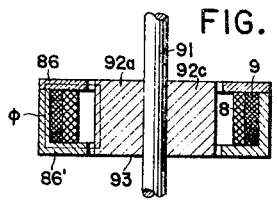
FIG. 17 is a section taken along the line XVII—XVII of FIG. 17.

The pulse generator including the exciting and pulse windings 8 and 9 respectively may have a construction as illustrated in FIGS. 16 and 17 wherein like reference numerals have been employed to identify the components corresponding to those illustrated in FIGS. 9 and 11. The pulse generator is substantially similar to that illustrated in FIGS. 9 through 11 excepting that a bevelled face 89 and a circumferential face 90 such as previously described are formed on each of magnetically permeable pieces 92a through d of a rotor member 93 rather than on each of magnetic pole pieces 87a through d and 88a through d and that no permanent magnet is used. Accordingly, a magnetic core comprises an annular disk of any suitable magnetic material 86 and a hollow cylindrical member of the same material 86' closed at one end. The pulse winding of annular shape 9 is coaxially disposed in contact with the inner wall of the cylindrical member 86' and the exciting winding of annular shape 8 abuts against the pulse winding 9.

The arrangement illustrated in FIG. 15 is operated as follows:

Assuming that the transistor 114 has supplied thereto a base current to turn on, the primary winding 35 of the ignition coil 36 is energized by the source 10 through the conducting transistor 34. As in the previous arrangements, the transistor 13 has a suitable bias potential determined by the voltage divider 16–17 to be conducting with a suitable voltage drop maintained across the collector and emitter electrodes thereof and cooperates with the resistors 39 and 20 to limit the magnitude of the base current flowing through the transistor 11 permitting the exciting winding 8 of the pulse generator to be weakly energized by the source 10.

A magnetic flux produced by this exciting winding passes through the magnetic core 86–86' and the air gaps formed between the magnetic pole pieces of the core and the magnetically permeable pieces of the rotor member 93. For example, considering that portion of the magnetic flux associated with the magnetic pole pieces 88a and 87a it will be readily seen from FIG. 17 (see dotted-and-dashed line $\Phi$) that the magnetic flux passes from the core portion 86 through the pole piece 88a, the permeable piece 92a, the pole piece 87a, the core portion 86' and back to the core portion 86 to link the pulse winding 9. Since the exciting winding 8 produces a low magnetomotive force and since the magnetic flux passing through the magnetic core 86–86' is low in density the magnetic flux is impelled to pass through the circumferential face 90 of the associated permeable piece.

With the rotor member 93 rotated, therefore, the pulse generator will produce low trigger pulse of alternate polarity such as waveforms $e_{11}$ and $e_{21}$ shown in FIG. 19 illustrating a view similar to FIG. 12. The negative pulse or pulse in the direction of the arrow $s_1$ shown by the winding 9 in FIG. 15 passes through the rectifier 24 and the capacitor 120 and is applied across the base and emitter electrodes of the transistor 114 in the reverse direction. Once this pulse has reached a predetermined magnitude $E_B$ (see FIG. 19) the transistor 114 turns off to turn off the transistor 34. The turning off of the transistor 34 interrupts the flow of current through the primary winding 35 of the ignition coil 36 to strike an ignition spark across a selected one of the ignition plugs, for example, the ignition plug 12a through the distributor device 122.

On the other hand, the positive pulse or the pulse in the direction of the arrow $s_2$ shown aside the winding 9 in FIG. 15 charges the capacitor 19 through the rectifier 21 and another rectifier. However, a voltage stored by the capacitor 19 is less than the Zener or breakdown voltage $E_Z$ (see FIG. 19) of the Zener diode 22 because the pulse has a low magnitude and therefore the positive pulse does not affect the transistor 13. As a result, the exciting winding 8 is maintained in its weakly energized state.

Under these circumstances, an increase in the number of revolutions of the engine to increase variation in magnetic flux per unit time within the core 86–86' in pulse winding 9 will produce a trigger pulse having high peak magnitude. Thus the capacitor 19 is charged to a voltage above the breakdown voltage $E_Z$ of the Zener diode 22 to render the same conductive. Therefore, the transistor 13 has that portion of the base current supplied thereto also by the capacitor 19 resulting in decrease in the voltage drop across the collector and electrodes of that transistor. This decrease in voltage drop causes the flow of base current through the transistor 11 to increase and a voltage drop across the emitter and collector electrodes thereof to correspondingly decrease. Thus the current flowing through the exciting winding 8 is increased to increase the magnetic flux passing through the core 86–86'. The increase in magnetic flux permits the same to pass further through the bevelled face 89 of the magnetic element 92a having a high magnetic reluctance. Thus the pulse winding 9 will produce a pulse increased in duration as shown by the waveform $e_{12}$ in FIG. 19. Also the transistor 114 will turn off at a time point in advance of an angle of $\theta_1$ (see FIG. 19) of the time point at which the pulse having the waveform $e_{11}$ is produced. Thus the ignition timing advances by an angle of $\theta_1$.

When the number of revolutions of the engine is further increased the capacitor 19 is charged to a higher voltage and accordingly the transistor 11 becomes more conductive to increase the current for energizing the exciting winding 8. Therefore, the pulse winding 9 will produce a pulse such as that having a waveform $e_{13}$ shown in FIG. 19 with the result that the ignition occurs at a time point in advance by an angle of $\theta_2$ of the time point at which the pulse $e_{11}$ is produced.

The engine will be increased in number of revolutions to such an extent that the transistor 11 is conducting with a low voltage drop across the emitter and collector electrodes thereof to thereby apply substantially the voltage of the source 10 to the exciting winding 8. Under these circumstances, that portion of the magnetic flux passing through each circumferential face 90 is also converted into a pulse by the pulse winding 9. At that time the spark advance characterizes of the circuitry are saturated.

As previously pointed out, the arrangement illustrated in FIG. 15 includes the control transformer 109 for controlling an ignition point in accordance with loading of the internal combustion engine. One form of the control transformer suitable for this purpose is shown in FIG. 18. The control transformer 109 comprises a cylindrical housing 130, a hollow cylindrical bobbin 131 disposed coaxially within the housing 130, and the aforesaid magnetic core 113 movably disposed in the bobbin 131. The housing 130 is divided into a winding space and a diaphragm space by a barrier 132 having a central aperture. Within the winding chamber the previously described main, auxiliary and output windings 111, 110 and 112 respectively are disposed around the bobbin 131 and on the bottom of the housing 130 in the named order. The housing 130 is closed at one end with a resilient diaphragm 133 which, in turn, is secured to that end by a cover 134 which may be flanged to the housing 130.

The magnetic core 113 is operatively connected to the diaphragm 133 through a connecting rod 135 and a washer 136. A coiled spring 136 serves to normally bias the diaphragm 133 toward the barrier 132 to contact the magnetic core with the bottom of the housing.

The interior of the cover 134 communicates with an intake manifold for the engine through connecting pipe 138. Disposed within the intake manifold 137 is a throttle 139 rotatable about its axis 140. The reference characters A and B designate the carbureter and cylinder sides of the intake manifold respectively and the reference numeral 141 designates an opening formed on the housing 130 for the purpose of communicating the diaphragm space with the atmosphere.

In operation, a leakage current flows from the source 10 through the collector and emitter electrodes 106 and 107 of the transistor 105 to the main winding 111 to induce a voltage across the auxiliary winding 110. This voltage across the winding 110 causes the transistor 105 to be conducting. Thus the transistor 105 cooperates with the main and auxiliary windings 111 and 110 to effect blocking oscillation in the manner well known to those skilled in the art. Therefore, the output winding 112 can provide an alternating voltage. The output voltage from the output winding 112 is, after rectification by the by the rectifier 104, applied across the resistor 103.

When the intake manifold 137 has a pressure higher at the cylinder side A than at the carbureter side B or when the engine is operating at its full load, the magnetic core is positioned in its position illustrated in FIG. 18 rendering a degree of coupling between the main and output windings 111 and 112 maximum. Therefore, the resistor 103 will have the maximum voltage applied thereacross and the transistor 97 is put in substantially blocked state. Under these circumstances, the pulse winding 9 can produce a pulse such as that having a waveform $e_{12}$ shown in FIG. 19.

It is now assumed that the throttle 139 is moved to its position illustrated by dotted line in FIG. 18 with the engine operated on light loading. In the assumed conditions the pressure on the cylinder side A of the intake manifold 137 is reduced and the atmospheric pressure on that side of the diaphragm 133 serves to move the diaphragm toward the connecting pipe 135 against the action of the coiled spring 139. This movement of the diaphragm is accompanied by movement of the magnetic core 113 toward the barrier 132 which also serves as a stop for the magnetic core 113. Therefore, the degree of coupling between the main and output windings 111 and 112 is decreased to reduce the output from the output winding 112. Accordingly, the transistor 97 has supplied thereto a sufficient base current to render the transistor 11 conducting whereby the exciting winding 8 is strongly energized. Thus the pulse winding 9 will provide a pulse such as that having a waveform $e_{13}$ shown in FIG. 19 with the result that the ignition point is correspondingly advanced.

Referring to FIG. 20, there is illustrated a still further embodiment of the invention using a magneto-generator such as that previously described. It is characterized in that the generator is not required to be energized with a current as compared with the arrangement illustrated in FIG. 15. In FIG. 20 wherein like reference numerals designate the components identical with those illustrated in FIGS. 8 and 15, a pulse winding 150 included in a magneto-generator as will be later described has one end grounded and the other end connected to a base electrode 65 of a transistor 26 through a Zener diode 57 and a capacitor 60 as in the arrangement illustrated in FIG. 8. Connected across the Zener diode 57 is a transistor 151 including an emitter, a collector and a base electrode 152, 153 and 154 respectively. That is, the anode and cathode of the Zener diode 57 are connected to the collector and emitter electrodes 153 and 152 of the transistor 151 respectively. The base electrode 154 of the transistor 151 is connected to one of outputs of a control transformer 109 similar to the control transformer 109 as previously described in conjunction with FIG. 15. The emitter electrode 152 of the transistor 151 is connected to the other output of the transformer 109 through a resistor 155 and a rectifier 156 with the junction of both components 155 and 156 connected to a smoothing capacitor 157 connected to the one terminal of the transformer 109. From a comparison of FIG. 20 with FIGS. 8 and 5 it will be seen that other respects are substantially identical with a combination of the arrangements illustrated in FIGS. 8 and 15.

As shown in FIG. 21 the control transformer used with this example includes an auxiliary, main and output windings 110, 111 and 112 respectively reversed in position from those illustrated in FIG. 18. The other respects are quite identical with the corresponding component shown in FIG. 18.

FIG. 22 shows a magneto-generator or a pulse generator used with the arrangement illustrated in FIG. 20. The generator comprises a U-shaped magnetic core 158 the magnetic path of which includes a permanent magnet 159 and on which the pulse winding 150 is inductively disposed. The generator includes further a rotor member substantially similar to that previously described in conjunction with FIG. 16. For purpose of simplicity, however, only one magnetically permeable piece 160 of the rotor member is shown in FIG. 22.

When an internal combustion engine involved is continued to be operated to rotate the rotor member 160 in the direction of the arrow illustrated in FIG. 22, trigger pulses such as shown in FIG. 23 appear in the arrangement illustrated in FIGS. 20 and 22. Among such pulses a pulse in the direction of the arrow $s_2$ shown aside the winding 150 in FIG. 20 passes from the pulse winding 150 through the Zener diode 57, the capacitor 60, the base 63 and emitter of the transistor 26, an emitter resistor 62 and back to the winding 150 to thereby decrease the internal resistance of the transistor 26. This causes a change in a flow of current through a primary winding 68 of a transformer 67 to induce a voltage across its secondary winding 69.

The voltage thus induced is supplied to a transistor 31 of a monostable multivibrator 30 through a rectifier 70. Since the monostable multivibrator 30 in its stationary state includes the transistor 31 maintained in its off state and the transistor 32 maintained in its on state, the output from the secondary winding 69 causes the transistor 31 to turn on to thereby turn off the transistor 32. Therefore, a potential at the collector electrode 77 of the transistor 32 becomes equal substantially to a potential at a positive terminal of a source of direct current 10 to turn off a switching transistor 34. The turning-off of the transistor 34 interrupts a flow of current through a primary winding 35 of an ignition coil 36 to induce across its secondary winding 37 a high voltage which, in turn, discharges a selected one of ignition plugs 124a through d.

It is noted that, after the transistor 31 is maintained in its on state for a period of time determined by a time constant of a capacitor 33 and a resistor 80, the multivibrator converts automatically its operating state where the transistor 31 is maintained in its off state while the transistor 32 is maintained in its on state.

On the other hand, a voltage pulse provided by the pulse winding 150 in the direction of the arrow $s_2$ shown aside the winding 150 in FIG. 20 is applied from the winding 150 through the resistor 62, the emitter 63 and base 65 of the transistor 26 to the Zener diode 57. It is assumed that the magnetic core 113 of the control transformer 109 is positioned so as to minimize a coupling between the main and output windings 111 and 112 respectively. Under the assumed condition the transistor 151 is maintained in its off state as will be hereinafter described. With the engine operated at a low speed, the pulse (in the direction of the arrow $s_1$) from the pulse winding 150 will have a waveform $e'_{11}$ as shown in FIG. 23 whose peak magnitude is below the breakdown voltage $E_Z$ of the Zener diode 57. Therefore, the pulse has no effect upon the transistor 26.

When the engine is increased in speed the pulse provided in the $s_1$ direction by the signal winding 150 will have a waveform $e'_{12}$ as shown in FIG. 23. Therefore, the pulse serves to block the flow of base current through the transistor 26 at an intersection of the waveform $e'_{12}$ with dotted line $E_Z$ whereupon a voltage is induced across the secondary winding 69 of the transformer 67 which voltage serves to effect to discharge across a selected one of the ignition plugs 124a through d in the similar manner as above described. However, it is to be noted that an ignition angle is advanced by $\alpha_1$ (see FIG. 23).

When the engine is further increased in speed pulse from the pulse winding 150 will have a waveform $e'_{13}$ as shown in FIG. 23 and provides an advance angle of $\alpha_2$ (see FIG. 23) in the same manner as above described.

With respect to loading of the engine the operation of the arrangement illustrated in FIG. 20 will now be described. When a throttle 139 is in its position illustrated by solid line in FIG. 21 the magnetic core 113 is farthest remote away from the windings 111, 110 and 112. In such a state or on heavy loading of the engine a voltage produced across the output winding 112 is minimum and maintains the transistor 151 in its off state. If the throttle 139 is in its position illustrated by dotted line in FIG. 21 and corresponding to light loading of the engine then a diaphragm 133 is displaced toward a connecting pipe 138 to render the magnetic core 113 to increase the coupling between the main and output windings 111 and 112 respectively. This permits the output winding 112 to provide a higher voltage to thereby charge the capacitor 157 to a high voltage. Therefore, a current flows from the charged capacitor 157 through the resistor 155, the emitter 152 and collector 154 of the transistor 151 to bring the transistor into a predetermined conductive state. For example, if the pulse from the pulse winding 150 has the waveform $e'_{12}$ (see FIG. 22) the same is applied to a circuit which may trace from the pulse winding 150, the resistor 62, the emitter-to-base circuit of the transistor 26, the capacitor 60, the emitter-to-collector circuit of the now conducting transistor 151 and back to the winding to turn on the transistor 26. Therefore, an ignition point corresponds to a point P on the waveform $e'_{12}$ below the intersection of the same with the line $E_Z$, and advances by an angle of $\beta$ as shown in FIG. 23.

From the foregoing it will be appreciated that the objects of the invention have been accomplished by the provision of a spark advance device for an internal combustion engine comprising a semiconductor switching element for switching an ignition coil, said element being responsive to a trigger pulse to turn off the ignition coil to render the coil to produce an ignition pulse, the trigger pulse being either variable in duration in accordance with the operating state of the engine or effective to turn off the coil at a time point dependent upon that operating state to thereby advance an ignition point.

While the invention has been described with respect to several embodiments thereof it is to be understood that various changes in the details of construction and the combination of and arrangement of parts may be resorted to within the spirit and scope of the invention. For example, the particular semiconductivity of the individual transistors may be reversed from that indicated.

What I claim is:

1. A spark advance device for an internal combustion engine, comprising an ignition coil having a primary winding and adapted to be connected to an ignition plug; a pulse generator means including a stationary magnetic core member having poles, a rotor member driven by the engine to come into periodic opposition to said stationary magnetic core member, an air gap being formed between the poles of said magnetic core membed and said rotor, the width of said air gap varying in the direction of rotation of said rotor member, said rotor member in said state of opposition forming a magnetic path including said stationary magnetic core member, an exciting winding inductively disposed on said stationary magnetic core member to impart a magnetomotive force to said magnetic path, a pulse winding inductively disposed on said stationary magnetic core member to link said magnetic path to produce an output pulse through a variation in magnet flux passing through said magnetic path due to rotational movement of said rotor member, and means for varying a current supply to said exciting coil to vary a time point at which said output pulse is produced across said pulse winding; switching means including a semiconductor switching element adapted to be opened by said output pulse produced across said pulse winding and operative to interrupt a flow of current through said primary winding of said ignition coil to produce a high ignition voltage to effect ignition of the engine at a time at which the engine is to be ignited; and control means for controlling the exciting current applied to said exciting winding to vary a time point at which said output pulse is produced thereby to control the ignition time point of the engine.

2. A spark advance device as defined in claim 1, wherein said control means is operative to control the exciting current applied to said exciting coil in response to a variation in the rate of revolution of the engine thereby to control the time point of ignition of said engine in response to the variation in the rate of revolution of the engine.

3. A spark advance device as defined in claim 1, wherein said control means includes a semiconductor element for receiving the output signal produced across said pulse winding of said signal generator means to vary the exciting current applied to said excitting winding in response to a variation in the rate of revolution of the engine whereby the time point of ignition of the engine is adjusted in response to the variation in rate of revolution of the engine.

4. A spark advance device as defined in claim 1, wherein said control means comprises said pulse winding of said pulse generator means, a Zener diode for receiving the output pulse produced across said pulse winding of said pulse generator means and to be rendered conductive when said output pulse exceeds a predetermined value, and a semiconductor element for receiving said output pulse after said Zener diode has become conductive to vary the exciting current applied to said exciting winding in response to a variation in the rate of revolution of the engine, whereby when the rate of revolution of the engine exceeds a predetermined value, the time point of ignition of the engine is adjusted in response to the variation in the rate of revolution of the engine.

5. A spark advance device as defined in claim 1, wherein said control means is operative to control the exciting current applied to said pulse winding in response to a variation in loading on the engine thereby to control the time point of ignition of the engine in response to the variation in loading on the engine.

6. A spark advance device for an internal combustion engine as defined in claim 1, wherein said control means includes Hall generator means for producing an output dependent upon loading of the engine and thereby to control the current for energizing said pulse generator means in accordance with loading of the engine.

7. A spark advance device as defined in claim 1, wherein said control means comprises a pair of windings having a coupling degree dependent upon a variation in loading on the engine, and a semiconductor element for receiving an output voltage from one of said pair of windings to control the exciting current applied to said pulse and thereby adjust the time point of ignition of the engine in response to the variation in loading on the engine.

8. A spark advance device as defined in claim 1, wherein said control means comprises a semiconductor element for varying the exciting current applied to said exciting winding in accordance with a variation in the rate of revolution of the engine, and another semiconductor element for varying the exciting current applied to said exciting winding in accordance with a variation in loading on the engine whereby the ignition time of the engine is adjusted in accordance with the variations in the rate of volution of and the loading on the engine.

References Cited by the Examiner

UNITED STATES PATENTS

| 2,898,392 | 8/1956 | Jaeschke | 123—148 X |
| 2,918,913 | 12/1959 | Guiot | 123—148 X |
| 3,060,346 | 10/1962 | Sohner | 123—148 X |
| 3,139,876 | 7/1964 | Jukes | 123—148 |
| 3,161,803 | 12/1964 | Knittweis | 123—148 X |
| 3,184,640 | 5/1965 | Jukes | 123—148 X |

FOREIGN PATENTS 861,534  2/1961  Great Britain.

MARK NEWMAN, *Primary Examiner.*

LAURENCE M. GOODRIDGE, *Examiner.*